United States Patent

Fryxell et al.

(10) Patent No.: US 6,812,259 B2
(45) Date of Patent: Nov. 2, 2004

(54) HYDROETCHING OF HIGH SURFACE AREA CERAMICS USING MOIST SUPERCRITICAL FLUIDS

(75) Inventors: Glen Fryxell, Kennewick, WA (US); Thomas S. Zemanian, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 179 days.

(21) Appl. No.: 10/045,930

(22) Filed: Oct. 26, 2001

(65) Prior Publication Data

US 2003/0091492 A1 May 15, 2003

(51) Int. Cl.$^7$ .......................... C01B 33/14; C01B 33/20
(52) U.S. Cl. ..................... 516/110; 516/98; 516/111; 516/112; 423/335
(58) Field of Search .................... 516/98, 110, 111, 516/112; 423/335

(56) References Cited

U.S. PATENT DOCUMENTS 5,391,364 A * 2/1995 Cogliati ...................... 423/335
5,911,658 A * 6/1999 Yoldas ........................ 516/101

OTHER PUBLICATIONS

The Colloid Chemistry of Silica, Edited by Bergna, (American Chemistry Society, Wash, DC, 1994), Jun. 1994, pp. 378–387.*

Kruk, M. et al., "*A Unified Interpretation of High–Temperature Pore Size Expansion Processes in MCM–41 Mesoporous Silicas*", p. 4590–4598, 1999, J. Phys. Chem. B, 1999, 103, month unknown.

Sayari, A., "Unprecedented Expansion of the Pore Size and Volume of Periodic Mesoporous Silica", p. 2920–2922, 2000, Angew. Chem. Int. Ed., 2000, 39, No. 16, month unknown.

Sayari, A. et al., "*New Approaches to Pore Size Engineering of Mesoporous Silica*", p. 1376–1379, 1998, Advanced Materials, month unknown.

* cited by examiner

Primary Examiner—Daniel S. Metzmaier
(74) Attorney, Agent, or Firm—Douglas E. McKinley, Jr.

(57) ABSTRACT

Aerogels having a high density of hydroxyl groups and a more uniform pore size with fewer bottlenecks are described. The aerogel is exposed to a mixture of a supercritical fluid and water, whereupon the aerogel forms a high density of hydroxyl groups. The process also relaxes the aerogel into a more open uniform internal structure, in a process referred to as hydroetching. The hydroetching process removes bottlenecks from the aerogels, and forms the hydrogels into more standard pore sizes while preserving their high surface area.

3 Claims, No Drawings

HYDROETCHING OF HIGH SURFACE AREA CERAMICS USING MOIST SUPERCRITICAL FLUIDS

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

CROSS-REFERENCE TO RELATED APPLICATIONS

Not Applicable

BACKGROUND OF THE INVENTION

Aerogels are low-density, high surface area solid materials, typically ceramic oxides, which have been expanded using an explosive release of pressure, typically in a supercritical fluid (SCF) or by flash evaporation of a solvent from a sol-gel precursor solution. One of the more common aerogels is composed of silicon dioxide (or "silica"), which is presently available from a variety of commercial vendors. Aerogels commonly display remarkably high surface areas, achieved at minimal cost due to the simplicity of the method used for their synthesis. For example, silica aerogels exhibiting surface areas of approximately 1,250 $m^2/g$, are commercially available. No time-consuming and expensive templating process is necessary for the manufacture of aerogels, as both the flash evaporation and SCF routes for their synthesis are readily amenable to large-scale production.

The high surface area exhibited by aerogels suggests their use in a variety of scientific and industrial applications. However, various limitations have curtailed the utility of aerogels in industrial applications, and aerogels have not found widespread use in applications where materials having a high surface area would be expected to present significant advantages.

For example, aerogels commonly exhibit a random pore structure which typically includes "bottlenecks", or regions within the aerogel wherein the pore sizes fall well below the average pore size for the material. This structure limits their use in applications where a consistent pore size is required. Also, aerogels are typically very fragile structures, rendering them unsuitable in applications where a high surface area material is only useful if it is able to withstand an applied force, even as slight a force as the capillary force of a liquid. Further, in many applications, a material having both a high surface area and exhibiting specific chemical properties is desired. In many instances, the aerogels will fail to provide the specific chemical properties necessary for a given application. To overcome both of these drawbacks, many having skill in the art have attempted to provide coatings for aerogels. The ability to chemically modify the internal surfaces of an aerogel would provide direct access to inexpensive, high-surface area materials useful in a variety of uses, including, without limitation, as sorbents, catalysts and sensor materials. In this manner, it has been proposed that the aerogels could be made to exhibit enhanced strength and/or that aerogels could be made to exhibit chemical properties desired for a particular application by coating the internal and external surfaces of the aerogels with materials bonded on one end to the aerogel, and having a molecule with desired chemical or "functional" properties at the other end.

Unfortunately, attempts to provide coatings on aerogels have so far met with little success. Traditional synthetic coating methods utilizing liquid carriers and the like have been unable to effectively coat the broad expansive surface area of aerogels for a variety of reasons. The random structure of the aerogel has a significant number of constrictions and/or blockages that hinder mass transport into the complex pore structure. Further, due to the high temperature nature of the synthetic protocol typically used to make aerogels, there is very little adsorbed water within the aerogel. Thus, in silica aerogels for example, the surface population of hydroxyl groups is quite low. This severely limits the amount of other species that can be bound by this surface. Also, as noted above, the ceramic oxide wall structure of the aerogels is extremely thin. Combined with the convoluted morphology of the aerogels, the presence of restrictive bottlenecks, and the hydrophobic nature of the material, it is difficult to form hydroxyl groups on aerogels at ambient pressure using standard solution phase methodologies. As a condensed liquid phase enters the pore structure, the capillary forces brought about by liquid column in the tiny pores can overcome the fragile strength of the aerogel wall, thereby crushing the internal structure of the aerogels simply by filling it with liquid.

Thus, there exists a need for methods and techniques whereby the hydroxyl groups may be formed on the surfaces of aerogels. There is a further need for methods and techniques which allow the pore distribution of the internal volume of aerogels to be narrowed, and the bottlenecks limiting transport into and out of the internal volume may be removed, thereby facilitating the deposition of other materials, such as strength enhancing monolayers and functionalized monolayers, on the surface of the aerogels without destroying their high surface area.

BRIEF SUMMARY OF THE INVENTION

Accordingly, it is an object of the present invention to provide a method for forming aerogel having a high density of hydroxyl groups on the surface of the aergel. As used herein, a "high density" of hydroxyl groups on the aerogels refers to the aerogels exhibiting greater than 1 hydroxyl group per square nanometer of the surface of the aerogel, and preferably greater than 3 hydroxyl groups per square nanometer of the surface of the aerogel and more preferably greater than 5 hydroxyl groups per square nanometer of the surface of the aerogel.

It is a further object of the present invention to provide a method for altering the surface area of an aerogel in a manner which reduces the incidence of bottlenecks while preserving the high surface area exhibited by the aerogels. Preferably, the pore sizes of these aerogels are between about 150 Å and 250 Å and the bottlenecks of these aerogels are between about 110 Å and 150 Å. It is also preferable that these aerogels have a pore size distribution of less than 50% of the mean pore diameter. More preferably, these aerogels have a pore size distribution that is less than 20% of the mean pore diameter, and more preferably still is a pore size distribution is less than 10% of the mean pore diameter.

These and other objects of the present invention are accomplished and enabled by the surprising discovery that aerogels, when exposed to a mixture of water and a near critical or supercritical fluid, will resolve into structures having increased surface areas, with a lessened incidence of bottlenecks. The process of exposing an aerogel to a mixture of a supercritical fluid and water is referred to herein as "hydroetching." An additional advantage of the hydroetching process is the formation of a high a density of hydroxyl groups on the aerogel's surfaces.

The method of the present invention provides aerogels that are amenable to the formation of mono-layers, which can be applied to render the aerogels into functionalized aerogels. The formation of such monolayers and functionalized aerogels is described in co-pending U.S. patent application Ser. No. 10/045,948, filed concurrently herewith, the entire contents of which are incorporated herein by this reference.

As mentioned above, the process of the present invention may also serve to modify the pore size distribution of the aerogel. Prior to processing, aerogel materials typically demonstrate a broad range of pore sizes and narrow bottlenecks, which impede the transport of material into and out of the internal void volume. BET analysis (Brunauer, Emmett, Teller) of aerogels produced by the method of the present invention has demonstrated that the process can narrow the pore size distribution (typically to approximately 200 Å+/−~50 Å) and remove the bottlenecks (typically to approximately 130 Å+/−~20 Å), thereby enhancing the transport of materials to and from the aerogel interior. As used herein, the "pore size distribution" is defined as that revealed by the adsorption isotherm of the BET experiment and bottlenecks are defined as that reveled by the desorption isotherm of the BET experiment.

Materials which have been formed into aerogels are generally limited to ceramic oxides. Silica, alumina, aluminosilicate, and combinations thereof are of particular commercial interest; however, as used herein the term "aerogel" should be understood to include any ceramic oxide which has been formed into a high surface area form by a process using a sudden release of pressure. Typically, but not meant to be limiting, the sudden release of pressure used in forming the aerogel is accomplished by the use of a supercritical fluid (SCF) or by flash evaporation of a solvent from a sol-gel precursor solution. Further, as used herein, the term "aerogels" should be understood to include "xerogels" as is used by those having skill in the art. While not formed with the same process utilizing a sudden release of pressure, xerogels nevertheless exhibit similar structure and may be usefully coated by the method of the present invention.

Supercritical fluids are defined herein as fluids at temperatures greater than their critical temperature, such that no liquid-gas phase separation exists at any pressure. Application of pressure allows compression of the fluid to liquid-like densities. The chief advantages of supercritical fluids over liquid media are that their gas-like transport properties (viscosity, diffusivity) allow rapid and thorough penetration of small pores and orifices, while their liquid-like solvating power maintains their solute carrying capacity. Moreover, the lack of a liquid/gas phase separation prevents limitations on penetration due to surface tension or capillarity; wettability is irrelevant.

Near critical fluids are defined herein as fluids at temperatures slightly below (<15° C.) their critical temperature, such that liquid-gas phase separation can exist, but the properties of the near critical fluid are similar to those of the fluid in the supercritical state. In particular, the surface tension of the fluid is virtually zero, and hence the limitations arising from capillary forces are not a problem as they are for truly liquid media. As used herein, the term "supercritical fluids" is intended to include such near critical fluids.

DETAILED DESCRIPTION OF THE INVENTION

A series of experiments were undertaken to demonstrate the effectiveness of the present invention. In the first of these experiments, a 2 mm. granular solid silica aerogel was acquired from Armstrong. The pore structure of the aerogel as provided was complex, ranging from 200–600 Å. The aerogel and a supercritical fluid/$H_2O$ mixture were then added to a pressurized cell. The aerogel was hydroetched by adding 26% (w/w) $H_2O$ to the cell and pressurizing for 15 minutes with $N_2$ or $CO_2$ at 150° C. and 7,500 psi. Once hydroetching was complete, 1–1.5 ml. of the MPTMS or 1.7 ml of EDAPTMS was then added to the cell, the cell was sealed, and pressurized with $N_2$ or $CO_2$ to 7,500 psi and held at 150° C. for the desired processing time.

EDAPTMS was obtained from United Chemical Technologies and used as provided. A supercritical $N_2$ fluid ($SCN_2$), 99.95% pure or better, was obtained from Scott Specialty gases and was then used in the deposition of EDAPTMS on the hydroetched aerogel.

Measurement of the pore distribution of the product material by BET analysis demonstrated a narrow pore distribution centered around 200 Å internal diameter, with minor instances of bottlenecks or passage restriction. The data are summarized in Table 1.

The preservation of the aerogel internal surface area is evident from the ability of the material to absorb Cu(II) from aqueous solution. This was demonstrated by the addition of a small amount of the EDAPTMS functionalized aerogel material to a 0.1 M $CuSO4_{(aq)}$ solution, resulting in rapid decolorization of the solution, leaving the solution water-white in 10–15 minutes, and the functionalized aerogel material a deep blue color.

TABLE 1

| Monomer | SCF | T [° C.] | P [bar] | Pore [Å] | Bottleneck [Å] | Surface area [$m^2$/g] |
|---|---|---|---|---|---|---|
| MPTMS | $CO_2$ | 150 | 517 | 180 ± 31% | 130 ± 30% | 284 |
| MPTMS | $CO_2$ | 150 | 517 | 300 ± 57% | 180 ± 25% | 266 |
| EDAPTMS | $N_2$ | 100 | 517 | 170 ± 38% | 130 ± 21% | 247 |

Notes:
1. MPTMS: 3-mercaptopropyltrimethoxysilane, CAS registry 4420-74-0
2. EDAPTMS: 2-aminoethyl-3-aminopropyltrimethoxysilane, CAS registry 1760-24-3
3. Percent deviations expressed as negative deviation from average at half peak height.

A further set of experiments were carried out without deposition of the monolayer in near critical and supercritical carbon dioxide. For the samples hydroetched in supercritical carbon dioxide, BET analysis revealed a narrowed pore distribution, removal of most bottlenecks, and preservation of most of the internal surface area of the aerogel, when compared to the results of the BET analysis of the untreated aerogel. The samples hydroetched in near critical carbon dioxide showed similar pore size distribution narrowing, but less pronounced removal of bottlenecks, as set forth in the results shown in Table 2.

TABLE 2

| Fluid | H₂O added | T [°C.] | P [bar] | Time [min] | Pores [Å] | Bottlenecks Å | Area [m²/g] |
|---|---|---|---|---|---|---|---|
| Untreated | none | — | — | — | 100–700 | 72 ± 13% | 1087 |
| near crit. CO₂ | 25.2% (w/w) | 19 | 517 | 5 | 50–80 | 50 ± 18% | 1026 |
| near crit. CO₂ | 26.5% (w/w) | 20 | 517 | 90 | 180 ± 42% | 120 ± 17% | 922 |
| near crit. CO₂ | 24.8% (w/w) | 18 | 517 | 240 | 65 ± 50% | 50 ± 16% | 862 |
| SCCO₂ | 28.0% (w/w) | 150 | 517 | 45 | 400 | 90 | n.a. |
| SCCO₂ | 28.0% (w/w) | 150 | 517 | 165 | 320 ± 22% | 100 ± 10% | 1244 |

Notes:
1. SCCO2: supercritical carbon dioxide
2. Percent deviations (where given) expressed as negative deviation from average at half-peak height.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for forming an aerogel having a high density of hydroxyl groups comprising the step of exposing an aerogel to a mixture of added water and a supercritical fluid.

2. The method of claim 1, wherein said aerogel is provided as a ceramic oxide.

3. The method of claim 1, wherein said ceramic oxide is provided as selected from the group consisting of silica, alumina, aluminosilicate, and combinations thereof.

* * * * *